(12) United States Patent
Hsu et al.

(10) Patent No.: US 7,599,826 B2
(45) Date of Patent: Oct. 6, 2009

(54) SYSTEM AND METHOD FOR GENERATING VARIOUS SIMULATION CONDITIONS FOR SIMULATION ANALYSIS

(75) Inventors: Shou-Kuo Hsu, Shenzhen (CN); Cheng-Shien Li, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 611 days.

(21) Appl. No.: 11/309,042

(22) Filed: Jun. 13, 2006

(65) Prior Publication Data

US 2007/0129921 A1 Jun. 7, 2007

(30) Foreign Application Priority Data

Jul. 13, 2005 (CN) .................. 2005 1 0035985

(51) Int. Cl.
*G06F 17/50* (2006.01)
(52) U.S. Cl. ............... 703/14; 716/4; 716/6; 714/724; 714/734; 341/120
(58) Field of Classification Search .......... 703/14, 703/13; 716/6, 1, 4; 714/726, 724; 455/115.1, 455/102; 340/825.36; 341/120; 375/316
See application file for complete search history.

(56) References Cited

U.S. PATENT DOCUMENTS

| | | | | |
|---|---|---|---|---|
| 5,457,697 A * | 10/1995 | Malleo-Roach et al. | ..... | 714/726 |
| 6,259,389 B1 * | 7/2001 | McGrath | ..... | 341/120 |
| 6,671,663 B1 * | 12/2003 | Hellums et al. | ..... | 703/14 |
| 6,766,284 B2 | 7/2004 | Finch | | |
| 2002/0188916 A1 * | 12/2002 | Ito | ..... | 716/4 |
| 2004/0048585 A1 * | 3/2004 | Snyder et al. | ..... | 455/115.1 |
| 2005/0088314 A1 * | 4/2005 | O'Toole et al. | ..... | 340/825.36 |
| 2005/0226349 A1 * | 10/2005 | Manku | ..... | 375/316 |
| 2005/0251772 A1 * | 11/2005 | Youngman et al. | ..... | 716/6 |
| 2006/0117274 A1 * | 6/2006 | Tseng et al. | ..... | 716/1 |
| 2006/0141952 A1 * | 6/2006 | Kung et al. | ..... | 455/102 |

FOREIGN PATENT DOCUMENTS

| CN | 1340979 A | 3/2002 |
|---|---|---|
| CN | 1422457 A | 6/2003 |

OTHER PUBLICATIONS

Hai-Long Chen and Hong Li, "Generation and Analysis of PN Sequence Based on MATLAB", Computer Simulation, May 2005, pp. 98-100, vol. 22, Issue 5, China Academic Journal Electronic Publishing House, China.

* cited by examiner

*Primary Examiner*—Paul L Rodriguez
*Assistant Examiner*—Kandasamy Thangavelu
(74) *Attorney, Agent, or Firm*—Wei Te Chung

(57) ABSTRACT

A system for generating various simulation conditions for simulation analysis is disclosed. The system includes: a signal generating module (301) for generating an N-bit binary sequence consisting of "1" and "0" according to signal source parameters; a application module (302) for applying the N-bit binary sequence to generate the various simulation conditions according to control parameters; a noise generating module (303) for generating N influence values of Gauss noises with N standard deviations to N signal bit-widths; and an addition module (304) for adding the Gauss noises to corresponding digital waveform positions of the generated simulation conditions. A related method is also disclosed.

15 Claims, 5 Drawing Sheets

US 7,599,826 B2

SYSTEM AND METHOD FOR GENERATING VARIOUS SIMULATION CONDITIONS FOR SIMULATION ANALYSIS

FIELD OF THE INVENTION

The present invention relates to a system and method for simulation, particularly to a system and method for generating various simulation conditions for simulation analysis.

DESCRIPTION OF RELATED ART

When using Hspice for simulation analysis of an integrity of signal, it is necessary to describe signal simulation conditions properly on top of the components and interconnections parameters. A simulation conditions device makes use of a buffer for a fan-out of a signal, which includes a series of 0s and 1s voltage expressions and a corresponding sequence of corresponding time parameters.

Usually, the way of simulation conditions generating device is by inputting the series of 0s and 1s voltage expressions and the corresponding sequence of corresponding time parameters one by one by a user. However, the process of manual input is slow, and it is easy to make mistake when calculating and inputting, moreover, it is not easy to add applications thereinto as length of signals may be too long.

Therefore, what is needed is a system and method for generating various signal simulation conditions for simulation analysis, to automate the manual input method and generate a series of "0s" and "1s" voltage expressions and sequence of corresponding time parameters, thereby outputting the necessary signal simulation conditions more efficiently.

SUMMARY OF THE INVENTION

A system for generating various simulation conditions for simulation analysis includes: a parameter inputting device for inputting signal source parameters and control parameters; a signal generating module for generating an N-bit binary sequence consisting of "1" and "0" according to the signal source parameters; and a application module for applying the N-bit binary sequence to generate various simulation conditions according to the control parameters.

A method for generating various simulation conditions for simulation analysis includes the steps of: generating an N-bit binary sequence consisting of "1" and "0" according to signal source parameters; and applying the N-bit binary sequence to generate the various simulation conditions according to control parameters.

Other advantages and novel features of the embodiments will be drawn from the following detailed description with reference to the attached drawings.

DETAILED DESCRIPTION OF THE INVENTION

Figure 1:
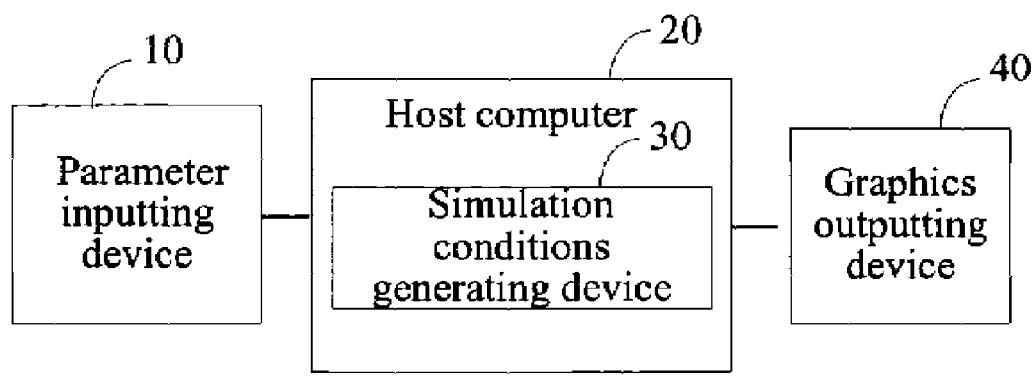
FIG. 1 is a schematic diagram of hardware configuration of a system for generating various simulation conditions for simulation analysis in accordance with a preferred embodiment.

FIG. 1 is a schematic diagram of hardware configuration of a system for generating various simulation conditions for simulation analysis (hereinafter, "the system") in accordance with a preferred embodiment. The system may be applied for automatically generating a source input file for circuit simulation analyst programs such as HSPICE. The system includes a parameter inputting device 10, a host computer 20 having a simulation conditions generating device 30 installed therein, and a graphics outputting device 40. The parameter inputting device 10 is used for inputting signal source parameters and control parameters to the simulation conditions generating device 30. The host computer 20 may be a notebook computer, a personal computer (PC), or a server. The simulation conditions generating device 30 is used for receiving the signal source parameters and the control parameters and generating various simulation conditions for simulation analysis. The graphics outputting device 40 may be a display, an LCD, or any other suitable device, and is used for displaying various graphics when the simulation conditions generating device 30 generates the simulation conditions.

Figure 2:
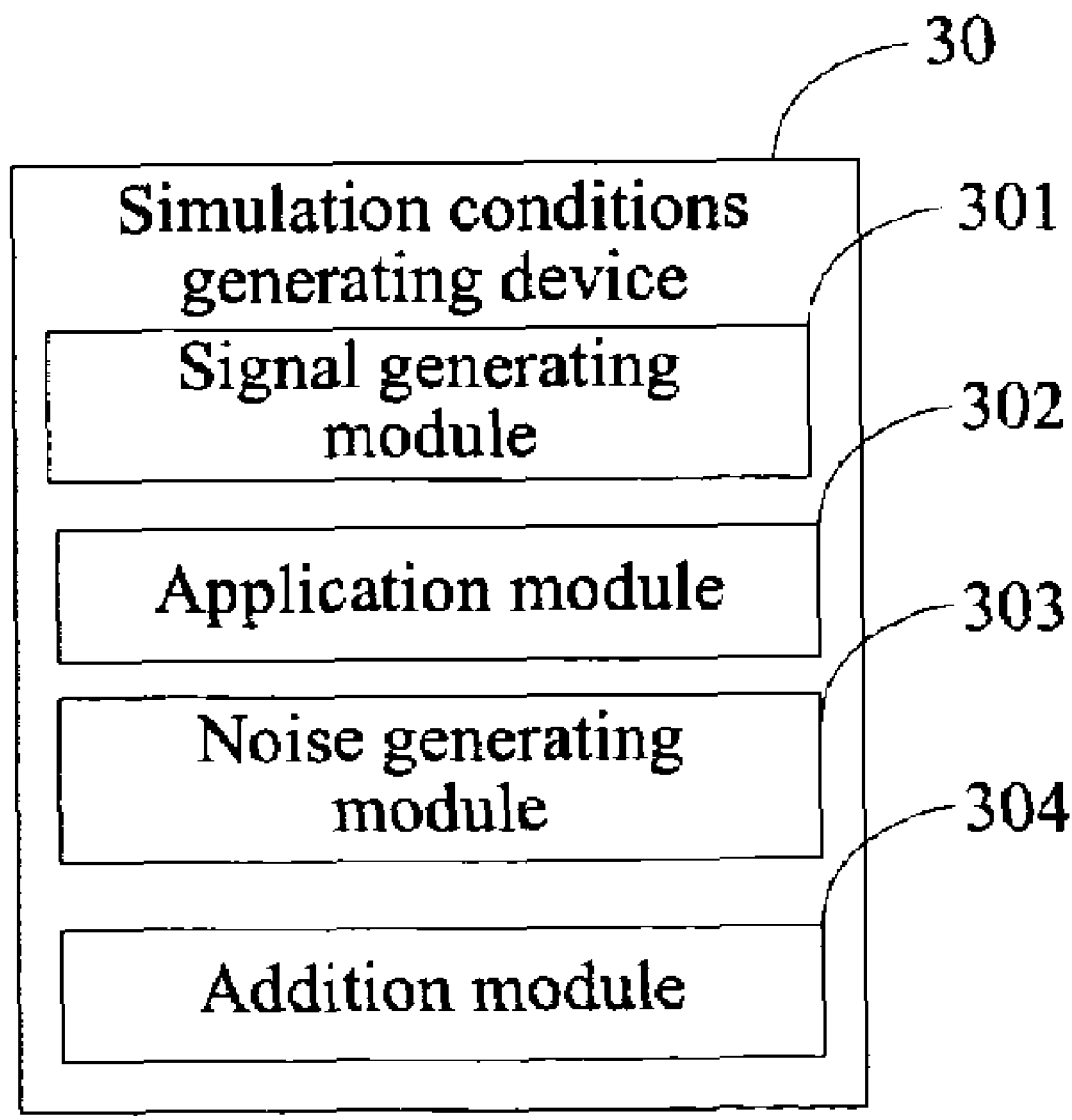
FIG. 2 is a schematic diagram showing function modules of a simulation conditions generating device of the system of FIG. 1.

FIG. 2 is a schematic diagram showing function modules of the simulation conditions generating device 30. Typically, the simulation conditions generating device 30 includes a signal generating module 301, an application module 302, a noise generating module 303 and an addition module 304.

The signal generating module 301 is used for generating an N-bit binary sequence consisting of "1s" and "0s" according to the signal source parameters. The N-bit binary sequence may be a stochastic binary sequence (SBS), a repeated binary sequence (RBS), or a pseudo random binary sequence (PRBS). The SBS consists of "1s" and "0s" randomly. The RBS consists of a repeating "1s" and "0s" combination, for example, "110,110,110,110,110" and "001,001,001,001,001". The PRBS consists of "1s" and "0s" according to a rule that any two adjacent "0s" and "1s" is unrelated, for example, "100,110,101,010,011,001,100" and "110,101,010,011,001,100,110".

The application module 302 has a plurality of sub-modules (described below in detail in relation to FIG. 3), and is used for applying the N-bit binary sequence to generate the various simulation conditions according to the control parameters.

The noise generating module 303 is used for generating N influence values of Gauss noises with N standard deviations to N signal bit-widths. The noise generating module 303 sets a standard deviation σ of Gauss distribution, and generates a stochastic numerical value (−7σ<X<7σ) of a greatest value that is 7 times N standard deviations. Afterwards, the noise generating module 303 converts the stochastic numerical value to a corresponding time value, and generates the N influence values. A signal bit-width is a value of time needed to process of a single bit "0" or a single bit "1". A Gauss noise is a change of the signal bit-width that is influenced by ambient, electromagnetic interference, temperature interference, and so on. The influence value is also a value of time. According to above mentioned described, if an advance signal bit-width is 10 seconds and an influence value of a gauss noise is minus 1 seconds, the signal bit-width influenced by the gauss noise is 9 seconds.

The addition module 304 is used for adding the Gauss noises to digital waveforms corresponding positions of the generated simulation conditions, and then generated various simulation conditions. A digital waveform shows a relation of a sequence consisting of a single "0" and "1" and a width of time of the single bit. The single bit is the single "0" or "1" in the N-bit binary sequence, thus the width of time of the single bit is a continual time of the single "0" or "1" that is in a logic state.

Figure 3:
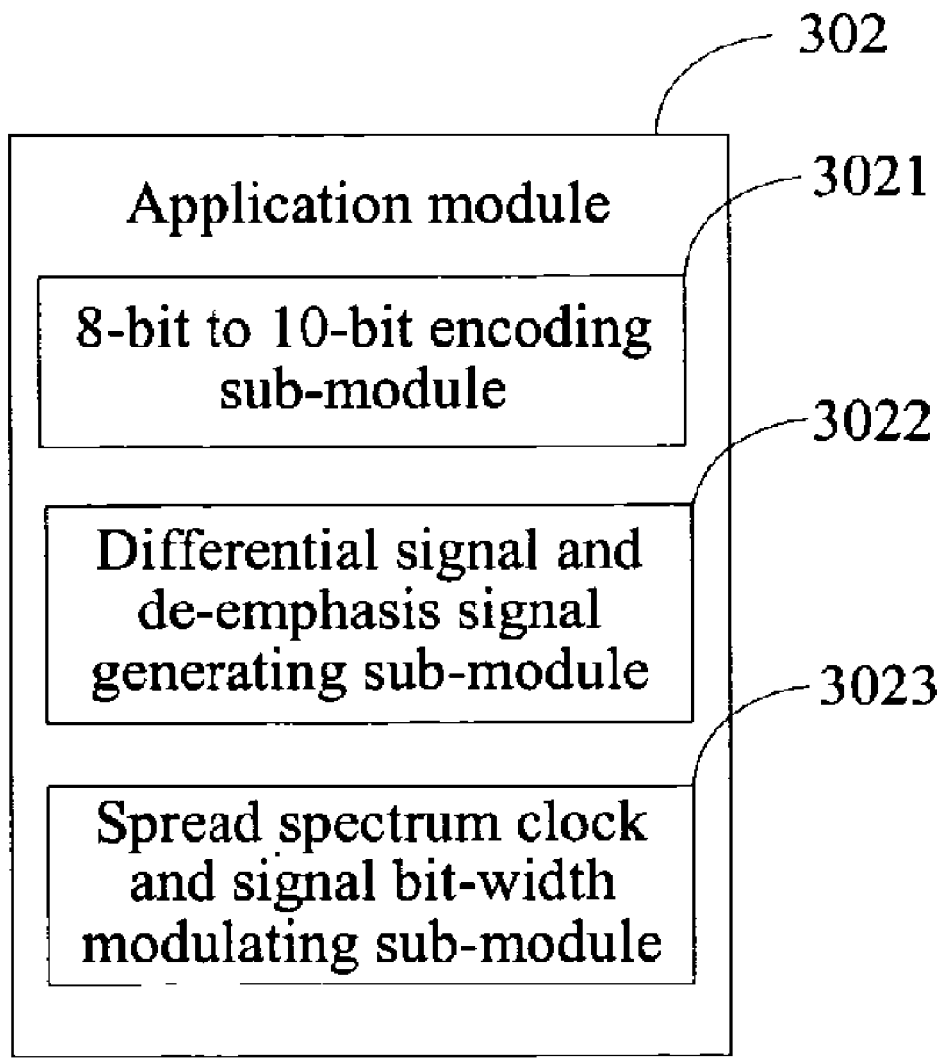
FIG. 3 is a schematic diagram showing function sub-modules of a application module of FIG. 2.

FIG. 3 is a schematic diagram showing function sub-modules of the application module 302. The application module 302 includes an 8-bit to 10-bit encoding (8*b*/10*b* encoding) sub-module 3021, a differential signal and de-emphasis signal (DS&DES) generating sub-module 3022, and a spread spectrum clock and signal bit-width (SSC&SBW) modulating sub-module 3023.

The 8*b*/10*b* encoding sub-module 3021 is used for encoding an 8-bit binary sequence into a 10 bit binary sequence in the N-bit binary sequence according to the control parameters. The 8 bit binary sequence is a segment of the N-bit binary sequence, therefore the N-bit binary sequence becomes a 1.25N-bit binary sequence after encoding. The application module 302 captures the N-bit sequence in the front of the 1.25N-bit binary sequence for application. The captured N-bit sequence consists of a series of "1" and "0" according to a rule that a bit cannot repeated itself more than five times. I.e., a bit "0" or "1" cannot appear consecutively more than five times in a row.

The DS&DES generating sub-module 3022 is used for generating a differential sequence according to the N-bit binary sequence and for generating a de-emphasis sequence according to the differential sequence. The DS&DES generating sub-module 3022 generates the differential sequence by reversing the "0" and "1" bits in the N-bit binary sequence to generate an antilogarithm N-bit binary sequence, the antilogarithm N-bit binary sequence is then further combined with the N-bit binary sequence. The de-emphasis sequence is generated by rearranging a last two bits of the differential sequence to the front. For example, if the N-bit binary sequence is "10101001," the antilogarithm N-bit binary sequence would be "010100110," therefore, the differential sequence is "10101001,010100110" a combination of the N-bit binary sequence with the antilogarithm N-bit binary sequence. Accordingly, the de-emphasis sequence is "10101011001,0101001" after rearranging the last two bits of the differential sequence to the front.

The SSC & SBW modulating sub-module 3023 is used for generating a digital waveforms according to the N-bit binary sequence, and generating simulation conditions with the spread spectrum clock and signal bit-width according to the digital waveforms. Since the digital waveform shows the relation of the sequence consisting of single the "0" and "1" and the width of time of the single bit, the SSC & SBW modulating sub-module 3023 generates the simulation conditions with the SSC & SBW by modulating the relation gradually and periodically, and generates a SSC preview graphic by fast Fourier transform (FFT).

Figure 4:
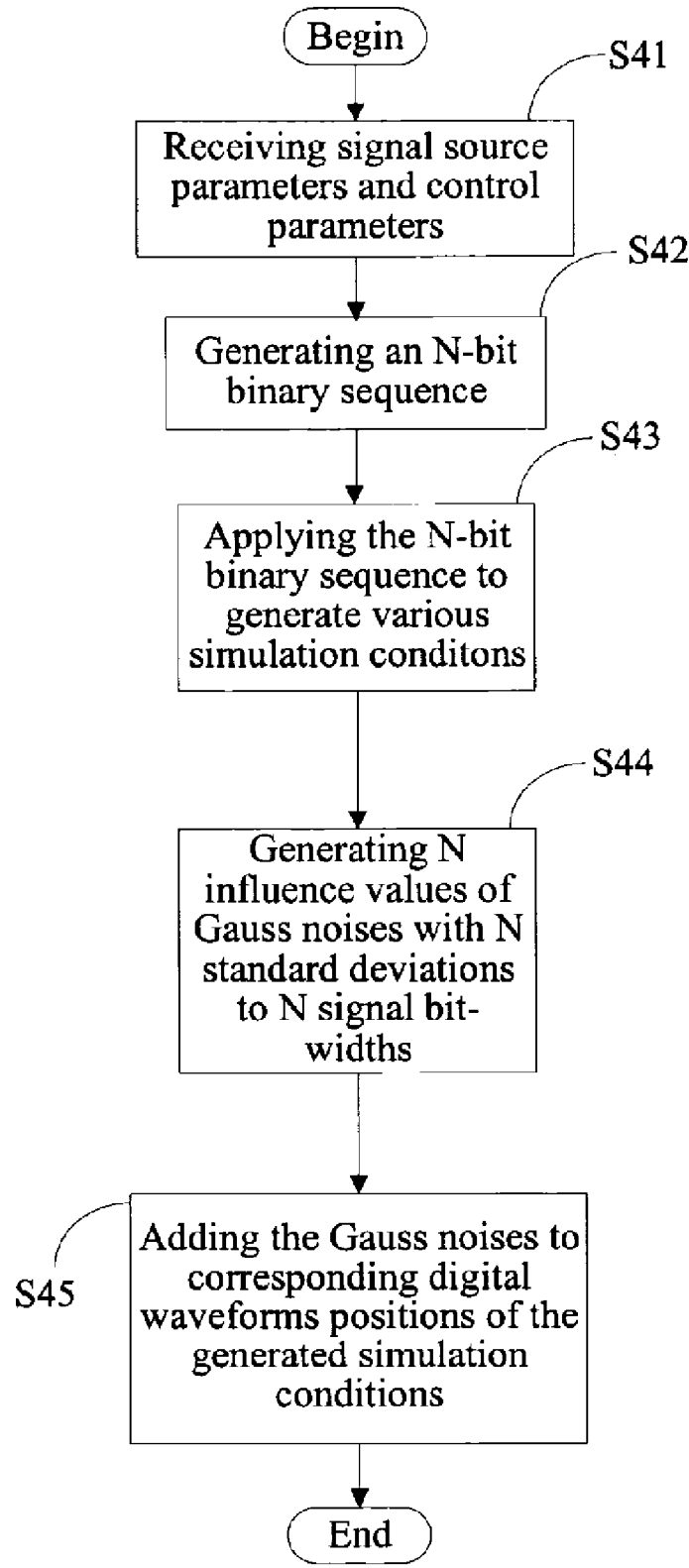
FIG. 4 is flowchart of a preferred method for generating various simulation conditions for simulation analysis by utilizing the system of FIG. 1.

FIG. 4 is flowchart of a preferred method for generating various simulation conditions for simulation analysis by utilizing the system of FIG. 1. In step S41, a user inputs signal source parameters and control parameters via the parameter inputting device 10, and the simulation conditions generating device 30 receives the signal source parameters and the control parameters. In step S42, the signal generating module 301 generates the N-bit binary sequence consisting of "1" and "0" according to signal source parameters. In step S43, the application module 302 applies the N-bit binary sequence to generate various simulation conditions according to control parameters. In step S44, the noise generating module generates N influence values of Gauss noises with N standard deviations to N signal bit-widths. In step S45, the addition module adds the Gauss noises to corresponding digital waveforms positions of the generated simulation conditions.

Figure 5:
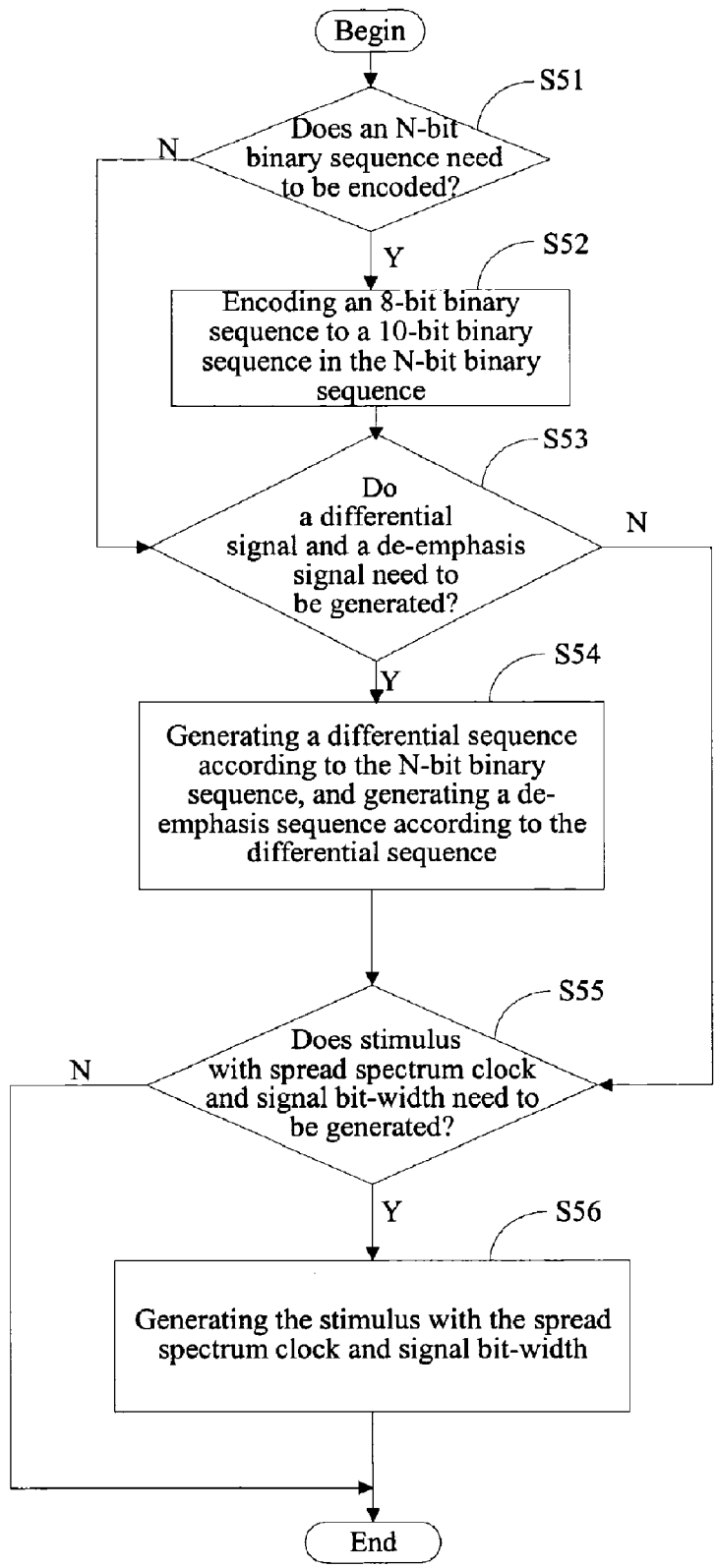
FIG. 5 is flowchart of a preferred method for application.

FIG. 5 is flowchart of a preferred method for application by utilizing the function sub-modules of FIG. 3. In step S51, the user determines whether there is a need to encode the N-bit binary sequence. If the user does not need to encode the N-bit binary sequence, the procedure goes directly to step S53. Otherwise, if the user needs to encode the N-bit binary sequence, in step S52, the 8*b*/10*b* encoding sub-module 3021 encodes an 8-bit binary sequence to a 10 bit binary sequence in the N-bit binary sequence.

In step S53, the user determines whether there is a need to generate a differential signal and a de-emphasis signal. If the user does not need to generate a differential signal and a de-emphasis signal, the procedure goes directly to step S55. Otherwise, if the user needs to generate the differential signal and the de-emphasis signal, in step S54, the DS&DES generating sub-module 3022 generates a differential sequence according to the N-bit binary sequence, and generates a de-emphasis sequence according to the differential sequence. Herein, the DS&DES generating sub-module generates the differential sequence by reversing the "0" and "1" bits in the N-bit binary sequence to generate an antilogarithm N-bit binary sequence, the antilogarithm N-bit binary sequence is then further combined with the N-bit binary sequence. The de-emphasis sequence is generated by rearranging a last two bits of the differential sequence to the front.

In step S55, the user determines whether there is a need to generate simulation conditions with the SSC & SBW. If the user does not need to generate the simulation conditions with the SSC & SBW, the procedure ends. If the user needs to generate the simulation conditions with the SSC & SBW, in step S56, the SSC & SBW modulating sub-module 3023 generates digital waveforms according to the N-bit binary sequence, and generates the simulation conditions with the SSC & SBW according to the digital waveforms. Herein, the SSC & SBW modulating sub-module generates the simulation conditions with the SSC & SBW by modulating a relation of an sequence consisting of single "0" and "1" in the N-bit binary sequence and a width of time of single bit gradually and periodically, and generates a SSC preview graphic by fast Fourier transform.

Although the present invention has been specifically described on the basis of preferred embodiments and preferred methods, the invention is not to be construed as being limited thereto. Various changes or modifications may be made to the embodiment and method without departing from the scope and spirit of the invention.

What is claimed is:

1. A system for generating various simulation conditions for simulation analysis, the system comprising:
   a parameter inputting device for inputting signal source parameters and control parameters;
   a signal generating module for generating an N-bit binary sequence consisting of "1" and "0" according to the signal source parameters; and
   an application module for applying the N-bit binary sequence to generate various simulation conditions according to the control parameters, wherein the application module comprises:
   a differential signal and de-emphasis signal generating sub-module for generating a differential sequence according to the N-bit binary sequence, and generating a de-emphasis sequence according to the differential sequence.

2. The system according to claim 1, further comprising:
a noise generating module for generating N influence values of Gauss noises with N standard deviations to N signal bit-widths; and
an addition module for adding the Gauss noises to corresponding digital waveform positions of the generated simulation conditions.

3. The system according to claim 1, wherein the application module further comprises:
an 8-bit to 10-bit encoding sub-module for encoding an 8-bit binary sequence to a 10 bit binary sequence in the N-bit binary sequence.

4. The system according to claim 1, wherein the differential signal and de-emphasis signal generating sub-module generates the differential sequence by combining the N-bit binary sequence with an antilogarithm N-bit binary sequence that is a result of reversing the signals from "0" to "1" and vice versa in the N-bit binary sequence, and generates the de-emphasis sequence by rearranging a last two bits of the differential sequence to the front.

5. The system according to claim 1, wherein the application module further comprises:
a spread spectrum clock and signal bit-width modulating sub-module for generating digital waveforms according to the N-bit binary sequence, and generating simulation conditions with the spread spectrum clock and signal bit-width according to the digital waveforms.

6. The system according to claim 5, wherein the spread spectrum clock and signal bit-width modulating sub-module generates the simulation conditions with the spread spectrum clock and signal bit-width by modulating a relation of a sequence consisting of a single "0" and "1" in the N-bit binary sequence and a width of time of a single bit gradually and periodically, and generates a spread spectrum clock preview graphic by fast Fourier transform.

7. The system according to claim 1, wherein the N-bit binary sequence is any one of a stochastic binary sequence, a repeated binary sequence and a pseudo random binary sequence.

8. A computer-based method for generating various simulation conditions for simulation analysis, the method comprising the steps of:
generating an N-bit binary sequence consisting of "1" and "0" according to signal source parameters using a processor of a computer; and
applying the N-bit binary sequence to generate various simulation conditions according to control parameters using the processor, comprising:
generating a differential sequence according to the N-bit binary sequence, and generating a de-emphasis sequence according to the differential sequence.

9. The method according to claim 8, further comprising the steps of:
generating N influence values of Gauss noises with N standard deviations to N signal bit-widths using the processor; and
adding the Gauss noises to corresponding digital waveform positions of the generated simulation conditions using the processor.

10. The method according to claim 8, further comprising the step of:
encoding an 8-bit binary sequence to a 10 bit binary sequence in the N-bit binary sequence.

11. The method according to claim 8, wherein the differential sequence is generated by reversing signals from "0" to "1" and vice versa in the N-bit binary sequence to generate an antilogarithm N-bit binary sequence and combining the N-bit binary sequence with the antilogarithm N-bit binary sequence.

12. The method according to claim 11, wherein the de-emphasis sequence is generated by rearranging a last two bits of the differential sequence to the front.

13. The method according to claim 8, further comprising the step of:
generating digital waveforms according to the N-bit binary sequence, and generating simulation conditions with the spread spectrum clock and signal bit-width according to the digital waveforms.

14. The method according to claim 13, wherein the simulation conditions with the spread spectrum clock and signal bit-width is generated by modulating a relation of a sequence consisting of single "0" and "1" in the N-bit binary sequence and a width of time of single bit gradually and periodically.

15. The method according to claim 14, further comprising generating a spread spectrum clock preview graphic by fast Fourier transform.

* * * * *

UNITED STATES PATENT AND TRADEMARK OFFICE
CERTIFICATE OF CORRECTION

PATENT NO.       : 7,599,826 B2                              Page 1 of 1
APPLICATION NO. : 11/309042
DATED            : October 6, 2009
INVENTOR(S)      : Hsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Twenty-eighth Day of September, 2010

David J. Kappos
*Director of the United States Patent and Trademark Office*